July 3, 1934.  C. W. SINCLAIR  1,965,203
HUB SHELL AND METHOD OF FORMING SAME
Filed Aug. 18, 1930  2 Sheets-Sheet 1
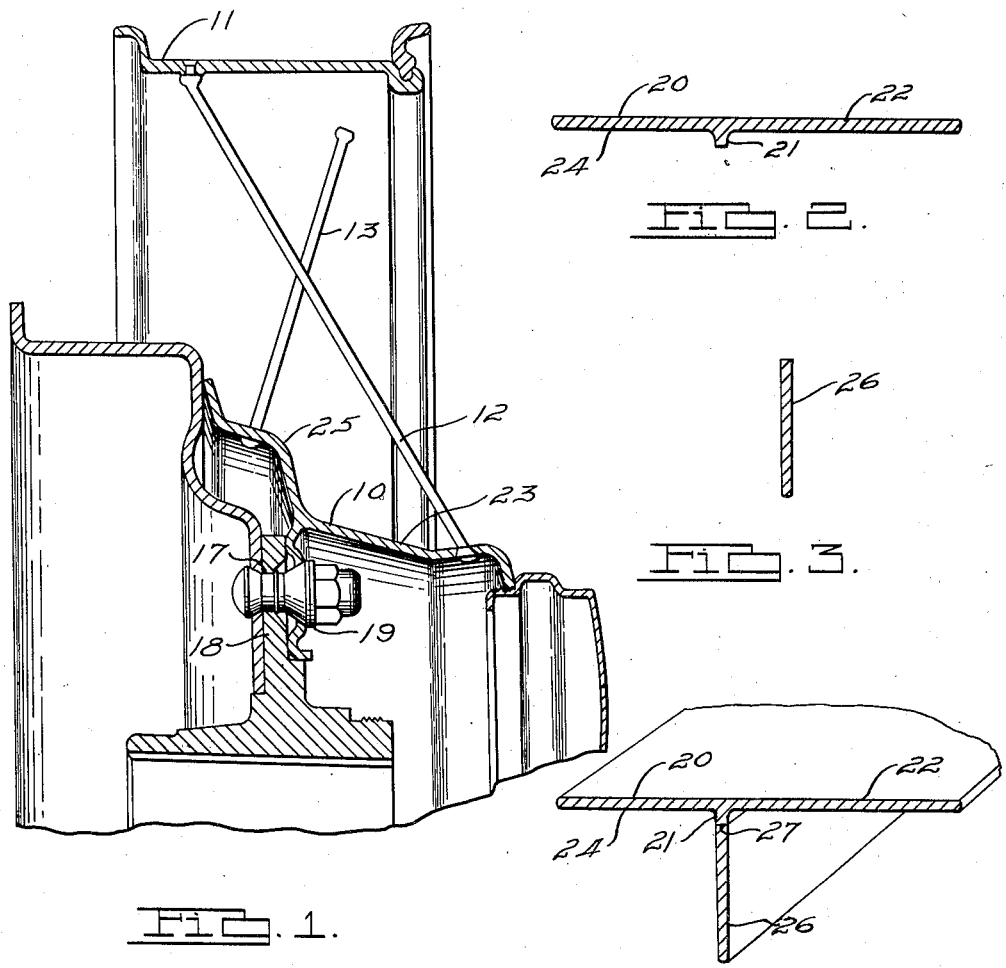
INVENTOR
Charles W. Sinclair.
BY
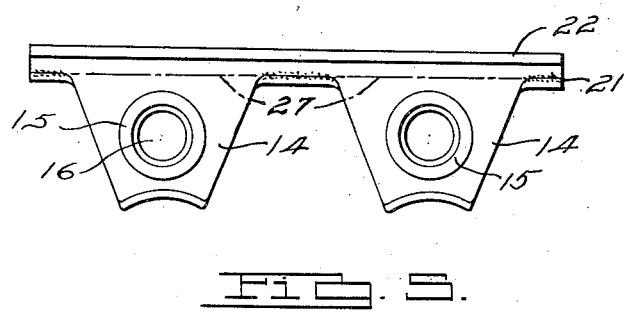
ATTORNEY July 3, 1934.  C. W. SINCLAIR  1,965,203

HUB SHELL AND METHOD OF FORMING SAME

Filed Aug. 18, 1930  2 Sheets-Sheet 2

INVENTOR
Charles W. Sinclair.
BY
ATTORNEY

Patented July 3, 1934

1,965,203

UNITED STATES PATENT OFFICE 1,965,203

HUB SHELL AND METHOD OF FORMING SAME

Charles W. Sinclair, Detroit, Mich., assignor to Kelsey-Hayes Wheel Corporation, Detroit, Mich., a corporation of New York Application August 18, 1930, Serial No. 476,197

4 Claims. (Cl. 29—159.3)

This invention relates generally to vehicle wheels and has particular reference to the manufacture of hub shells for vehicle wheels.

The invention contemplates the provision of an improved method of producing hub shells which not only reduces the cost of manufacture to a minimum, but provides a hub shell having a minimum number of parts and as a consequence, one which is extremely light in weight.

A further advantageous feature of this invention is to construct a hub shell of the bolted-on type having attaching portions located therein so as to be thoroughly concealed from view.

The foregoing as well as other objects of the invention will be made more apparent as this description proceeds, especially when considered in connection with the accompanying drawings, wherein:

Figure 1 is a cross-sectional view through a vehicle wheel equipped with a hub shell constructed in accordance with this invention.

Figure 2 is a cross-sectional view illustrating a strip of stock from which a portion of the hub shell is formed.

Figure 3 is a view similar to Figure 2 showing another piece of stock from which the remaining portion of the hub shell is formed.

Figure 4 is a fragmentary perspective view showing one step in the method of manufacture.

Figure 5 is a side elevation of the construction shown in Figure 4 illustrating another step in the method of manufacture.

Figure 6 is a sectional view illustrating still another step in the method of manufacture.

Figure 8:
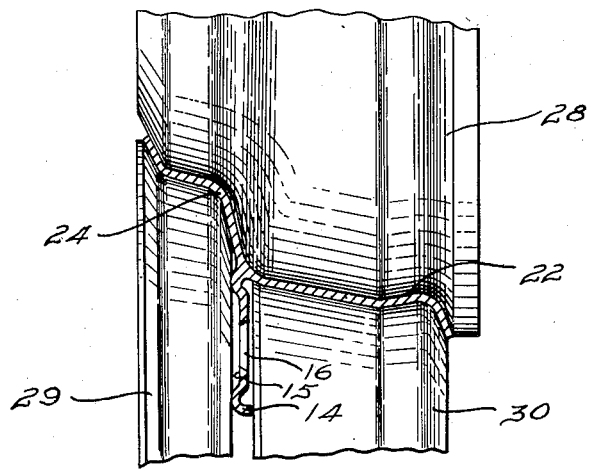

For the purpose of illustration, I have shown my invention as used in connection with vehicle wire wheels of the type having a hub shell 10 and a rim 11 encircling the hub shell and held in concentric relation therewith by means of the front and rear spokes 12 and 13, respectively. The inner ends of the front and rear spokes are respectively secured to the front and rear end portions of the hub shell 10 in any suitable manner while the outer ends thereof are secured to the base of the rim 11. In order to provide for attaching the wheel to a vehicle, the hub shell 10 is provided with a plurality of lugs 14 extending inwardly from the shell intermediate the front and rear ends thereof so as to be thoroughly concealed from view. The lugs 14 are united with the inner surface of the shell to provide an integral construction and are formed with countersunk portions 15 having openings 16 therein registering with corresponding openings 17 in the fixed flange 18 of the inner hub and adapted to receive the fastening elements 19 for securing the shell to the fixed flange.

Referring now more in detail to the method for fashioning the hub shell 10, it will be noted from Figure 2 that a rolled section or strip of stock 20 is provided having an inwardly extending projection 21 intermediate the ends thereof. The portions 22 of the section 20 upon the front side of the projection 21 is of sufficient dimension to form the front or barrel section 23 of the hub while the portions 24 of the stock upon the rear side of the projection 21 is of sufficient dimension to form the rear section 25 of the shell. The strip of stock 26, illustrated in Figure 3, is of sufficient width to form the lugs 14 and is preferably butt-welded as at 27 to the projection 21 to form an integral construction.

Figure 7:
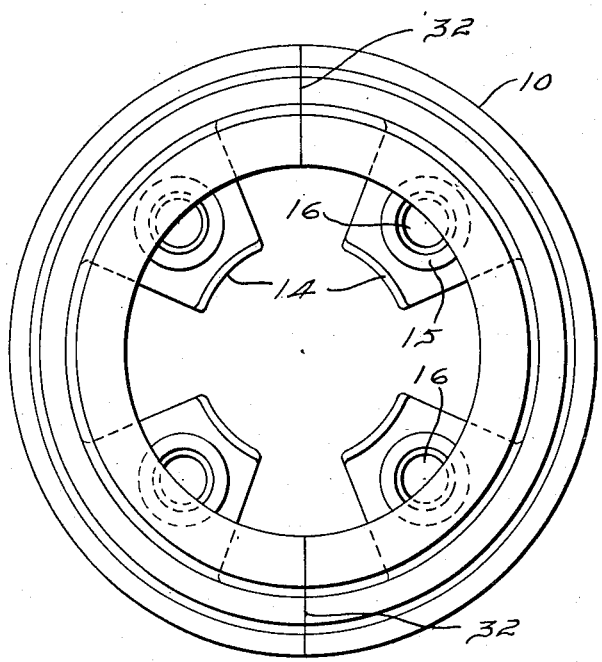
Figure 7 is a front elevational view of the completed hub shell.

The strip thus formed is then cut to lengths, each of sufficient dimension to form a portion or one-half of the completed hub shell. The inwardly extending portions 26 of the strips may then be blanked out, as shown in Figure 5, to form the lugs 14 whereupon the strips are introduced to a suitable rolling machine fashioned to form the strips substantially semi-circular and to impart a predetermined cross-sectional contour to the front and rear portions 22 and 24 of the strips. The rolling machine briefly comprises an outer roll 28 engaging the outer surface of the strip and a pair of inner rolls 29 and 30 arranged upon opposite sides of the lugs 14 and engaging the inner surfaces of the portions 22 and 24 of the strip. The peripheral portions of the rolls are so designed as to cooperate with each other to bend the portions 22 and 24 of the strip to the desired contour of the shell. Two of the semi-circular strips are then placed in registration with each other as shown in Figure 7 and welded along the lines 32 to form a complete hub shell. In this connection it is to be noted that the hub shell may be formed of any number of strips or may be formed of a single strip welded together at the free ends. The lugs 14 may be punched and countersunk by any suitable apparatus after the hub shell has been completed or prior to the completion of the hub shell, whichever is most convenient under the circumstances.

From the foregoing it will be obvious that the particular sequence of steps in the method of fashioning the hub shell may be rearranged without materially changing the finished product. For example, the strip 26 having the lugs blanked out therefrom, may be welded to the inwardly extending projection 21 prior to the rolling operation, as indicated above, or after the rolling operation and accordingly reservation is made to make such re-arrangements of steps and changes in construction as may come within the purview of the accompanying claims.

What I claim as my invention is:

1. Those steps in the method of forming a vehicle wheel hub shell which consists in providing a plurality of strips of metal of predetermined length having laterally extending projections intermediate the longitudinal edges thereof, rolling the strips to form arcuate portions conforming in shape to the desired contour of the hub shell, welding the ends of the arcuate portions together to form an annulus with the projections extending inwardly therefrom and circumferentially thereof, and fashioning the projections to form attaching portions.

2. Those steps in the method of forming a vehicle wheel hub shell which consist in providing a plurality of strips of metal having inwardly extending projections intermediate opposite side edges thereof, rolling the strips transversely of the projections to form arcuate sections of predetermined contour with the projections extending inwardly to provide attaching portions for the shell, and uniting the sections together to form an annulus conforming in shape to the desired contour of the shell.

3. Those steps in the method of forming a vehicle wheel hub shell which consist in providing a plurality of strips of metal of predetermined length having laterally extending projections intermediate opposite side edges thereof, rolling the strips of metal transversely of the projections to form arcuate sections with the projections extending inwardly toward the radii of said sections, uniting the sections together to form an annulus conforming to the shape of the desired hub shell, and fashioning the projections to form circumferentially spaced attaching portions for the shell.

4. A hub shell comprising a plurality of substantially T-shaped sections united together with the stem portions of the T extending inwardly, and attaching portions united to the inner ends of said stem portions.

CHARLES W. SINCLAIR.